Patented Mar. 4, 1947

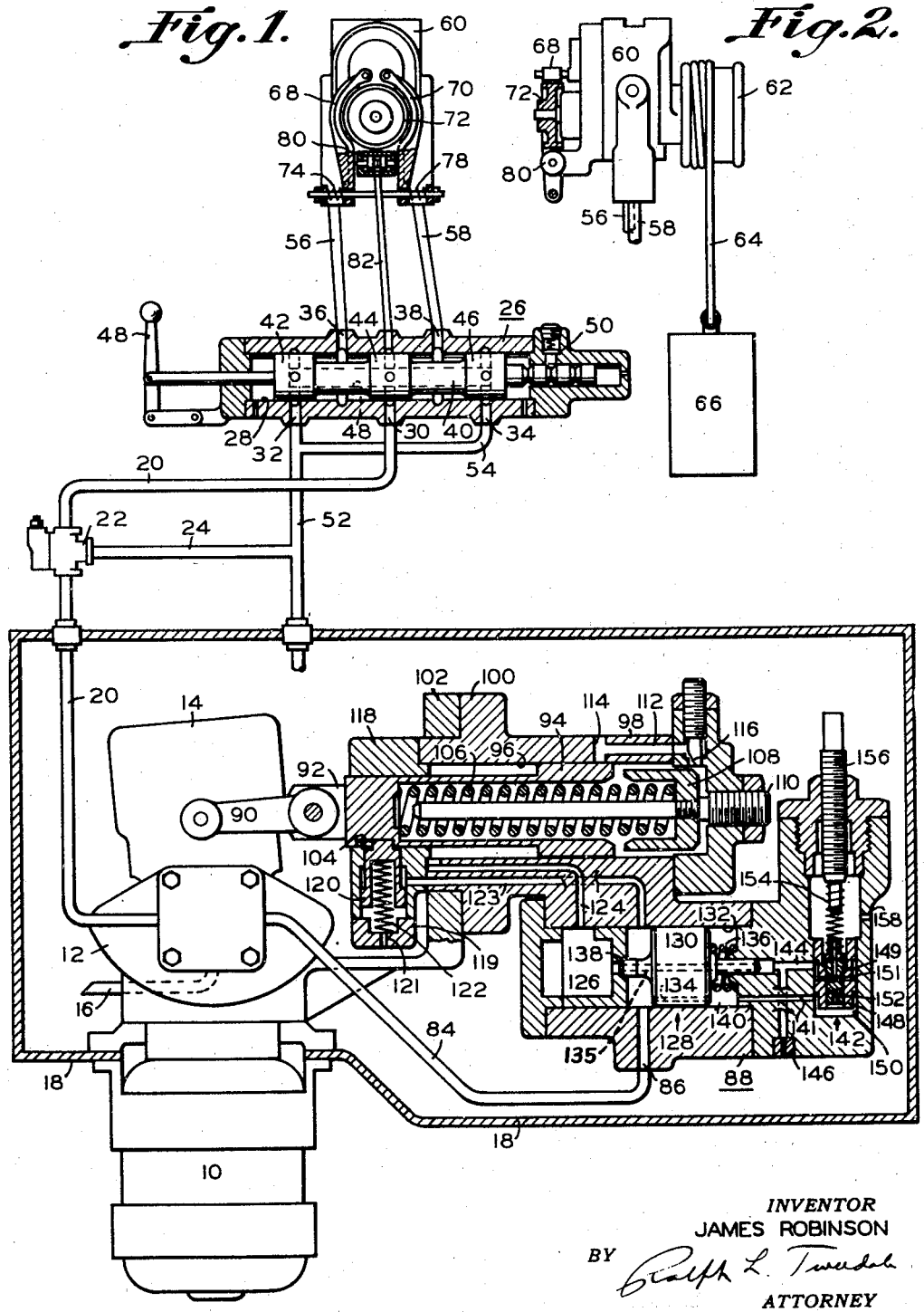

2,416,801

UNITED STATES PATENT OFFICE 2,416,801

HYDRAULIC POWER TRANSMISSION

James Robinson, Detroit, Mich., assignor to Vickers Incorporated, Detroit, Mich., a corporation of Michigan Application July 1, 1942, Serial No. 449,213

4 Claims. (Cl. 60—53)

This invention relates to power transmissions, particularly to those of the type comprising two or more fluid pressure energy translating devices, one of which may function as a pump and another as a fluid motor.

It is concerned particularly with such a system which has a variable displacement pump as the pressure supply and especially with the means for regulating the delivery of such pump.

It has heretofore been customary when using a pressure controlled variable displacement pump in systems of this class to use both open-center and closed center directional control valves depending on whether the operation of the pump was desired either at full stroke against negligible pressure or at minimum stroke against full pressure. In some cases it is desired to operate the pump at negligible pressure and at minimum stroke when the control valve is in central position, but this has not been possible with systems heretofore used.

It is an object of the invention, therefore, to provide an improved power transmission system wherein the pump may be operated both at minimum displacement and at minimum pressure when the motor is at rest.

Further objects and advantages of the present invention will be apparent from the following description, reference being had to the accompanying drawing wherein a preferred form of the present invention is clearly shown.

In the drawing:

Figure 1 is a diagrammatic view of a hydraulic power transmission system incorporating a pressure compensating mechanism showing the latter in cross section and in one form of the present invention.

Figure 2 is a side view of a portion of Figure 1.

In the embodiment of the invention shown in the drawing, a motor 10 is adapted to drive a variable delivery pump 12 whose pistons are contained in a yoke 14. The volume output of the pump 12 is determined by the angular setting of the yoke 14 which in this case is oscillatable to the left away from vertical position in which the displacement is zero.

Pump 12 is provided with a suction conduit 16 for withdrawing fluid from a sump 18 and a delivery conduit 20. The latter is provided with a relief valve 22 for bypassing oil to the tank through a conduit 24 whenever a predetermined maximum pressure is exceeded in the conduit 20.

Conduit 20 extends to the pressure port of a reversing valve 26 which, when in neutral position, illustrated, bypasses the pump delivery to the tank. The valve 26 comprises a main body having a longitudinal bore 28 provided with annular ports at spaced positions along its length, of which 30 is a pressure port, 32 and 34 are tank ports and 36 and 38 are cylinder or motor ports. A valve spool 40 is slidably mounted in bore 28 to selectively connect the pressure port to either cylinder port and the other cylinder port to a tank port. Valve spool 40 comprises a stem having three lands thereon, 42, 44 and 46, which are provided with a plurality of holes extending radially from bore 48. The lands 42, 44 and 46 of valve spool 40 are of a width sufficient to block their respective ports before opening the same as the spool 40 is shifted, that is, when spool 40 is moved one-half the effective operating distance, in either direction, the lands thereof will completely obturate their respective ports so as to cause pressure in conduit 20 to build up for a purpose hereinafter disclosed. The spool 40 is manually operated by lever 48 and is frictionally maintained in its three effective operating positions by a spring-pressed detent 50.

The tank ports 32 and 34 of valve 26 connect by conduits 52 and 54 to the tank, while the cylinder ports 36 and 38 connect by conduits 56 and 58 to either side of a fluid motor unit generally designated 60. The latter drives a load device indicated by a hoist drum 62 on which a cable 64 may be wound or unwound to raise or lower a load indicated diagrammatically at 66. For the purpose of stopping the latter at any height there is provided an automatic pressure-released brake structure which consists of supported pivoted arms 68 and 70 which are normally forced against a brake drum 72 by springs 74 and 78, respectively, so that normally the arms 68 and 70 grasp and hold the brake drum 72 mechanically. A cylinder 80 is positioned intermediate the arms 68 and 70 and contains oppositely acting pistons which, when pressure is admitted to the cylinder 80, will be forced outwardly to release the hold on the brake drum 72. Cylinder 80 is in communication with the pressure port 30 through a conduit 82.

The mechanism thus far described is well-known equipment ancillary to the pressure regulator hereinafter disclosed and per se forms no part of the present invention.

The variable displacement pump 12 is provided with a conduit 84 which connects the pressure side thereof with a port 86 of a pressure regulating mechanism generally designated 88. The yoke 14 of pump 12 is connected by a link 90 to a rod or stem 92 of a piston 94. The latter is slidably mounted in a cylinder 96 which is formed in a block 98 adapted to be mounted by means of a mounting flange surface 100 on a suitable casing 102 carried by the pump 12. The rod 92 of piston 94 is provided on its left end with a recess 104 for a purpose hereinafter disclosed.

A spring 106 normally biases the piston 94 to the left, resting against an adjustable spring stop 108 carried in the right-hand end of the cylinder 96. A suitable adjusting screw 110 is provided in the end wall of the cylinder 96 for adjusting the spring stop 108 which is also used for limiting the stroke of the piston 94, and, although it does at the same time adjust the degree of compression of the spring 106, this adjustment of the spring does not affect the action of the regulator as will be hereafter explained.

The righthand end of cylinder 96 is connected with the tank by means of a passage 112 communicating with a passage 114 which extends from the interior of cylinder 96 to the exterior of block 98. The passage 114 is adapted to be cut off by the piston 94 as it approaches its righthand limit of movement, and thereafter all the oil discharged from the righthand end of the cylinder 96 must pass through an adjustable restriction orifice 116 which is placed between the extreme righthand end of cylinder 96 and the passage 112, thus effecting a dashpot action.

The lefthand end of block 98 is provided with an end cover 118 which closely envelops the rod 92 of piston 94 and contains a piston lock plunger or latch 120. The latter is normally biased upward by a spring 122 and is adapted to become engaged in slot 104 and to hold the piston 94 retracted under conditions hereinafter disclosed. The lower end of cover 118 is provided with a cap 119 which contains a vent passage 121 serving to drain therethrough whatever fluid that may leak past the latch 120. The latter is connected to a pressure source for actuation thereof by a conduit 123 which communicates with the pressure conduit 84 through a chamber 132.

The extreme lefthand end of cylinder 96 communicates through conduit 124 with an overflow chamber 126 of a balanced relief valve generally designated 128. The latter comprises a piston 130 slidable in the cylinder 132 and having a restricted orifice 134 extending through the piston 130 and a central bore 135. A light spring 136 normally biases the piston 130 to the left, causing the hollow stem thereof to seat on an annular seat 138 to close communication between passages 84 and 124. The control chamber 140 and the overflow chamber 126 of relief valve 128 communicate through passages 141 and 144, respectively, with a chamber 150 containing a pressure responsive pilot valve 142. Passage 144 communicates with the tank by means of a restricted orifice 146.

The pilot valve 142 comprises a control valve sleeve 148 firmly mounted in the chamber 150 and having reduced diameter portions opposite the pasages 144 and 141 and permitting passage 144 to communicate with the interior thereof through a port 151, while passage 141 is in communication with the lower end, and thus constitutes the pilot pressure source. A control valve 152 is slidable in sleeve 148 and is yieldably maintained against its seat 149 under pressure of a light spring 154, the setting of which is controlled by an adjusting screw 156.

Control valve 152 consists of a cylindrical body having on its upper end a flange of somewhat larger diameter for seating purposes and a pair of oppositely extending holes in axial alignment, which holes communicate through radially extending holes with its periphery, which at this point is of somewhat reduced diameter. Pilot valve 142 when in the lowered position, illustrated, connects passage 144 with the tank through port 151 and the upwardly extending hole of control valve 152 and through passage 158. When lifted, pilot valve 142 connects the passage 141 with passage 144 through the downwardly extending hole of control valve 152 and thus vents chamber 140. Between its lowered and lifted positions there is a mid position in which port 144 is blocked. When, as will be described later, the normal operating pressure exists in line 20—84, piston 94 will have been unlatched, and piston 130 will be in a stable position with a small opening across seat 138. The pressure required to maintain these conditions will be sufficient to hold the valve spool of control valve 142 in a partially raised position where ports 151 are cut off and passage 144 is consequently blocked at its right-hand end. This pressure is transmitted undiminished through passages 86, 134 and 141 directly to valve 142 because there is no flow through these passages to cause any drop in pressure. These passages, then, carry full line pressure. There is a lower pressure maintained in the passages which communicate with chamber 126, and this pressure is dependent on the drop in pressure across seat 138 which in turn depends upon the position of piston 130 as well as the rate of flow across seat 138. Under stable conditions, the pressure maintained in chamber 126 must exactly balance the pressure created by spring 106 acting on the annular area of piston 94. This pressure is maintained by the action of valve 130 which, in order to achieve stability, must find the proper degree of opening which will pass the correct quantity of oil to supply the quantity escaping to tank through the fixed orifice 146.

When the pressure in delivery lines 20 and 84 tends to rise, the pressure will be felt through passage 134, chamber 140 and passage 141 so that control valve 142 will rise further to connect the control chamber 140 with the overflow chamber 126 through passage 144. This momentarily unbalances piston 130 permitting it to move slightly to the right until it becomes balanced in a slightly more open position. As this occurs, piston 94 will at first move to the right and, when it has brought the delivery pressure to the required value, will come to rest in a new position. Thereafter, a larger quantity of liquid will have to pass through the restricted passage 146 to the tank, and consequently a higher pressure will be maintained in passages 144, 126 and 124. This pressure will exactly balance the force of spring 106 in its more compressed condition.

Thus, any tendency for pressure to increase in lines 20—84 first raises pilot valve 142 to vent chamber 140. This permits valve 130 to open slightly wider and increase the rate of flow across seat 138. Momentarily there is then more oil flowing into cylinder 96 through seat 138 than flows out through restrictor 146 so piston 94 must move to the right, reducing pump delivery and offsetting the tendency for pressure to rise in lines 20—84. Also the oil vented from chamber 140 is added to that already going into chamber 126 through seat 138, thus increasing the speed of rightward movement of piston 94. When the line pressure has thus fallen to normal value, pilot valve 142 will again close and valve 130 come to its new position of rest with the seat 138 slightly more open than before. The continuous flow through seat 138 will now be of increased amount, and all of it will escape to tank through restrictor 146. There will be a higher pressure drop through restrictor 146, however, due to the necessity of maintaining in cylinder 96 a higher pressure to balance the increased force of spring 106.

However, these variations in force exerted by spring 106 of piston 94 under varying degrees of compression have no effect on the delivery pressure on the pump. The only change in pump pressure which may be present, at least theoretically, is that due to the varying compression of the relief valve spring 136. However, this change is extremely minute and in actual practice may be neglected. The factor which controls relief valve 128 is the setting of the spring 154 of the pilot three-way valve 142. As the latter is subjected only to tank pressure on its upper end, it will be seen that increases in pressure in the lefthand end of cylinder 96 due to increased compression of spring 106 cannot produce corresponding increases in pressure in conduit 84.

Should the pressure in lines 20—84 tend to fall off, valve 130 will remain stationary momentarily and valve 142 will move downwardly. This will connect passage 144 to tank through port 151 and passages 152 and 158. Consequently piston 94 will move to the left, exhausting fluid through passages 124, 126 and 135. During this time the continuous flow through seat 138, passages 135 and 141 and restrictor 146 is maintained at a somewhat diminished value depending on how far the pressure has fallen off in line 84. When the piston 94 and yoke 14 have moved far enough to offset the falling off of line pressure, pilot valve 142 will rise to its mid position, closing passage 144 and bringing the regulator to a stable condition. Valve 130 will find a new position slightly closer to seat 138 than before because slightly less oil is required to pass through seat 138 and out through passages 135 and 144 and restrictor 146 due to the decreased compression of spring 106.

In operation, while the electric motor is being energized, pump 12, with the yoke 14 in the position illustrated, will deliver fluid at a slow rate through conduit 20 to the reverse valve 26. The latter, being in neutral position, illustrated, will bypass the liquid to the tank through bore 48 of valve spool 40, ports 32 and 34 and conduit 52. Under this condition fluid circulates through this path at substantially no pressure. As a result, the load device 66 is held stationary.

Should the need arise to drive the load device 66 in the direction tending to lift it, lever 48 of valve 26 is pushed inward connecting pressure port 30 with cylinder port 36 and cylinder port 38 with tank port 34. As spool 40 is shifted, the ports are momentarily blocked so that there is no escape for the liquid delivered by the pump to pressure port 30. Pressure builds up accordingly in conduits 84, 86 and 123 very suddenly and causes latch 120 to be pulled out against the force of spring 122. The spring 122 preferably is relatively light and permits the latch to be retracted at a low pressure in conduits 20, 84 and 123, that is, one lower than the pressure required to release brakes 68—70. The sudden rise of pressure also temporarily causes valves 142 and 130 to respond and let additional oil into cylinder 96 to force piston 94 to the right momentarily and relieve the frictional force on latch 120. This action being momentary, the pressure is almost immediately reduced by the continued movement of valve spool 40, and, since piston 94 is now unlatched, it moves to the left, increasing the delivery of pump 12.

Because brake cylinder 80 and fluid motor 60 are the only possible paths of escape for the pump delivery, the pressure in line 20—84 will not fall below the value at which latch 120 is held retracted, and consequently the piston 94 is free to advance to the left as far as necessary to build up the system pressure to the setting of valve 142.

Pump 12 being no longer bypassed, pressure will be transmitted to the conduit 20 and branch conduit 82 which being connected to cylinder 80 will urge the pistons therein outwardly releasing the hold on the brake drum 72, thus allowing the motor unit 60 to rotate in the direction tending to lift the load 66. It will be seen that the automatic brake structure will be caused to release in response to the application of the given driving effort since, as the resisting load is applied to the hoist 62, the pressure in conduit 20 will be exactly proportional to the magnitude of that load resistance.

To stop the load 66 at a desired height, valve 26 is shifted to the position shown. This will again bypass the pump 12, causing the pressure-released brake structure to take hold. During the interval of the shifting, however, the pressure port 30 of valve 26 will become momentarily blocked as hereinbefore described, causing the pressure in conduit 20 to build up to a point beyond the working pressure. This pressure transmitted to pressure regulator 88 will cause piston 94 thereof to be moved to the extreme right in a manner already described. As the shifting of valve 26 is completed and pump 12 becomes bypassed, the pressure in conduits 20 and 84 will again drop substantially to zero permitting latch 120 to shift upward and become engaged in the piston recess 104, holding piston 94 in the position illustrated. This action is insured by the extra length of slot 104 which permits some leftward movement of piston 94 while latch 120 is moving upwardly. It is also insured by the fact that leftward movement of piston 94 is retarded by the necessity of forcing oil out through restrictor 146 and the restricted passageways of valve 152. The upward travel of latch 120, however, is substantially unimpeded because of the small displacement of its piston and the relatively open passage 123 leading directly to the main line 20—84.

It will be noted that upon starting the motor in operation the latch 120 is at the righthand edge of slot 104. Thus, the sudden pressure surge can quickly shift latch 120 downwardly and can only with great difficulty overcome the much greater inertia of piston 94 and yoke 14. Consequently, the latch is fully retracted while the piston 94 is barely moved during the short interval that port 30 is blocked. When port 30 is then connected to a motor line, for example, line 56, the delivery line pressure is reduced somewhat but not nearly to zero so that latch 120 is not moved upwardly by its relatively light spring. On the other hand, piston 94 may shift leftward under the urge of its spring 106, and, after a very slight movement, slot 104 will pass the latch 120 and it can no longer be effective.

In contrast to this action at starting, the action at stopping is just the opposite so far as latch 120 is concerned. Valve spool 40 being shifted to block port 30, the latch will be quickly retracted, and the piston 94 will be shifted rightward. Upon further shifting of valve spool 40, however, the delivery line 20 is opened freely to tank so that the light spring 122 may quickly shift the latch upwardly during the time that piston 94 is travelling the length of slot 104. Thus, the latch, due to its much lower inertia and due to the extra length of slot 104 as well as the restricted speed of leftward movement of piston 94, may be effectively released by blocking and unblocking port 30 at starting and engaged by the same action at port 30 at stopping. Also at starting, the pump delivery line pressure does not drop to zero after the valve port 30 is unblocked but is maintained above the pressure which permits latch 120 to engage by the necessity of releasing the brake and driving the load. At stopping, however, the pump delivery line pressure is dropped substantially to zero after port 30 is unblocked, thus permitting latch 120 to engage.

To lower the load 66, lever 48 of the reversing valve 26 is pulled outward connecting the pressure port with cylinder port 38 and cylinder port 36 with tank port 32. It will be readily seen that during the lowering operation the load 66 tends to drive the motor 60 in the lowering direction, which tendency is resisted and overcome by the brake. Thus pressure will rise until the brake is released sufficiently to permit motor 60 to rotate in the lowering direction at that pressure.

The pressure in the system will be transmitted through conduit 84 to the pressure regulator 88, and thence through conduit 123 to the latch 120. The latter will be forced downward, releasing its hold on piston rod 92.

Thus it will be seen that the pressure compensator will not only maintain a constant pump pressure within the volumetric range of the pump but will also unload the pump at its minimum capacity by means of a piston lock plunger which prevents unloading the pump at full capacity, and, as a consequence, jerking action is eliminated upon starting.

While the action of the pressure regulator 88 has been described with particular reference to its action under various conditions tending to cause a change in main line pressure, it will be seen that, with a hoist motor and brake device as disclosed, this action will ordinarily take place only at the beginning and end of a period of hoisting or lowering operation. Naturally the regulator must be set to maintain pressure sufficiently high to drive the heaviest load encountered and any lesser load will not impose enough pressure to even lift pilot valve 142 at all. Consequently, after the initial acceleration the piston 94 will be fully extended to the left, and valve 130 will seat on seat 138. The imposition of an overload will, of course, bring the regulator into action at any time and will normally completely stop the hoist. The regulator does, however, come into action as previously described each time the directional control valve 26 is operated to either stop or start the hoist. In so doing, the piston 94, having a restricted speed of movement, provides an excellent control over acceleration and deceleration of the hoist.

While the form of embodiment of the invention as herein disclosed constitutes a preferred form, it is to be understood that other forms might be adopted, all coming within the scope of the claims which follow.

What is claimed is as follows:

1. A fluid power transmission system comprising in combination a fluid pump and a fluid motor, a pump delivery regulator responsive to delivery pressure to normally maintain such pressure substantially constant, said regulator including a member normally biased toward the position of full pump delivery, a valve for reversing and bypassing the supply of fluid to the motor, and a pressure-released latch for detaining said regulator in reduced delivery position when the pump is by-passed, said latch being released by delivery pressure when the valve is shifted to motor operating position whereby the motor may be accelerated by the action of said regulator in moving to full delivery position.

2. A fluid power transmission system comprising in combination a fluid pump and a fluid motor, a pump delivery regulator responsive to delivery pressure to normally maintain such pressure substantially constant, said regulator including a member normally biased toward the position of full pump delivery, a valve for reversing and bypassing the supply of fluid to the motor, and a pressure-released latch for detaining said regulator in reduced delivery position when the pump is bypassed, said latch being released by delivery pressure when the valve is shifted to motor operating position whereby the motor may be accelerated by the action of said regulator in moving to full delivery position, said valve having its ports arranged to be momentarily blocked during shifting between bypassing and motor-operating positions, whereby a pressure surge may be built up to operate said latch.

3. A fluid power transmission system comprising in combination a fluid pump and a fluid motor, a pump delivery regulator responsive to delivery pressure to normally maintain such pressure substantially constant, said regulator including a member normally biased toward the position of full pump delivery, a valve for reversing and bypassing the supply of fluid to the motor, and a spring-engaged, pressure-released latch for detaining said regulator in reduced delivery position when the pump is bypassed, said latch having less inertia than said regulator and being released by delivery pressure when the valve is shifted to motor operating position, whereby the motor may be accelerated by the action of said regulator in moving to full delivery position.

4. A fluid power transmission system comprising in combination a fluid pump and a fluid motor, a pump delivery regulator responsive to delivery pressure to normally maintain such pressure substantially constant, said regulator including a member normally biased toward the position of full pump delivery, an open-center, four-way valve for reversing and bypassing the supply of fluid to the motor, and a pressure-released latch for detaining said regulator in reduced delivery position when the pump is by-passed, said latch being released by delivery pressure when the valve is shifted to motor operating position whereby the motor may be accelerated by the action of said regulator in moving to full delivery position.

JAMES ROBINSON.

REFERENCES CITED

The following references are of record in the file of this patent:

UNITED STATES PATENTS

| Number | Name | Date |
| --- | --- | --- |
| 1,848,006 | Ferris | Mar. 1, 1932 |
| 1,895,627 | Johnson | Jan. 31, 1933 |
| 1,902,437 | Ferris | Mar. 21, 1933 |
| 2,104,780 | Vickers | Jan. 11, 1938 |
| 2,210,129 | Rose | Aug. 6, 1940 |